United States Patent
Jacobs

(10) Patent No.: US 7,282,814 B2
(45) Date of Patent: Oct. 16, 2007

(54) BATTERY CONTROLLER AND METHOD FOR CONTROLLING A BATTERY

(75) Inventor: James K. Jacobs, Toronto (CA)

(73) Assignee: Electrovaya Inc., Mississauga, Ontario (CA)

( * ) Notice: Subject to any disclaimer, the term of this patent is extended or adjusted under 35 U.S.C. 154(b) by 428 days.

(21) Appl. No.: 10/793,951

(22) Filed: Mar. 8, 2004

(65) Prior Publication Data
US 2005/0194937 A1   Sep. 8, 2005

(51) Int. Cl.
H02J 1/00    (2006.01)
H02J 3/00    (2006.01)
(52) U.S. Cl. ...................................... 307/82
(58) Field of Classification Search ................ 307/82
See application file for complete search history.

(56) References Cited

U.S. PATENT DOCUMENTS

| | | | |
|---|---|---|---|
| 5,773,962 A | | 6/1998 | Nor |
| 5,786,992 A | * | 7/1998 | Vinciarelli et al. ........... 363/89 |
| 5,894,415 A | | 4/1999 | Habegger |
| 5,912,552 A | | 6/1999 | Tateishi |
| 6,177,780 B1 | | 1/2001 | Roy et al. |
| 6,243,277 B1 | * | 6/2001 | Sun et al. ...................... 363/65 |
| 6,329,792 B1 | | 12/2001 | Dunn et al. |
| 6,377,024 B1 | | 4/2002 | Choy |
| 6,639,383 B2 | * | 10/2003 | Nelson et al. ............... 320/116 |
| 2001/0049038 A1 | | 12/2001 | Dickman et al. |
| 2002/0008496 A1 | | 1/2002 | Shamoto et al. |
| 2002/0070705 A1 | | 6/2002 | Buchanan et al. |
| 2003/0091882 A1 | | 5/2003 | Schmidt et al. |
| 2003/0107906 A1 | | 6/2003 | Tokunaga et al. |
| 2003/0193318 A1 | | 10/2003 | Ozawa et al. |
| 2003/0197428 A1 | | 10/2003 | Hatton et al. |
| 2003/0214303 A1 | | 11/2003 | Ying |

* cited by examiner

Primary Examiner—Michael Sherry
Assistant Examiner—Carlos Amaya

(57) ABSTRACT

A battery controller for charging and discharging a plurality of batteries is disclosed. The battery controller has a plurality of direct current to direct current (DC to DC) converters connected to each other in series. Each battery of a plurality of batteries is electrically connectable to a respective DC to DC converter. A co-ordinator connected to each of the plurality of DC to DC converters controls charging and discharging of the battery electrically connected to the respective converter. The co-ordinator can also control charging and discharging of any one of the batteries to ensure that the battery retains sufficient electrical capacity, and, to increase the longevity of the respective batteries. Because each battery is electrically connected to a respective DC to DC converter, the energy from one battery can be used to charge another battery in order to monitor battery characteristics including energy capacity of each battery. Each of the DC to DC converters is selected to operate preferably below 30 volts while the total voltage of the entire battery system can be much more than 30 volts depending on the number of DC to DC converters placed in series.

8 Claims, 9 Drawing Sheets

BATTERY CONTROLLER AND METHOD FOR CONTROLLING A BATTERY

FIELD OF THE INVENTION

This invention relates to battery controllers and methods for controlling batteries. More particularly, the present invention relates to battery controllers used to control batteries and/or power converters connected in series to provide power to a load.

DESCRIPTION OF THE RELATED ART

There is a growing trend for use of batteries, such as lithium ion batteries and lead acid batteries, to power various devices, as diverse as electric cars, computers and cameras. There is also a growing trend to use batteries as an alternate or emergency power source, such as for telephone systems, cable systems and other forms of communication systems or computer systems. The use of batteries helps ensure that a system will survive power failures without interruption or damage to the underlying system, or, loss of data or communication. This is particularly important for emergency communication which is essential during power failures. In order to provide current and voltage at required levels for particular loads, regardless of the type of battery being used, it is known to have direct current to direct current (DC to DC) converters as well as other types of power converters. The converters both protect the load from the battery and/or the battery from the load. Furthermore, the converters convert the power from the battery to a form which can be used by the load. Some advanced rechargeable battery systems permit the same DC to DC converter to be used in reverse in order to recharge the battery.

Before proceeding to a discussion of DC to DC converter systems, a note on the converter terminology used herein will now be given. Power converters have at least two sets of electrical terminals. One set of power converter terminals is generally connected (directly or indirectly) across one or more batteries. This set of power converter terminals will herein be called the battery-side terminals. The other set of power converter terminals is generally connected (directly or indirectly) across a load or across an electrical power source for charging the batteries. This set of power converter terminals will herein be called the load-side terminals, even if they are connected across a battery charging power source. FIGS. 1A and 1B illustrate conventional controllers for controlling batteries. In particular, FIG. 1A illustrates a prior art system, identified generally by reference numeral 2, comprising a DC to DC converter 8 for converting electrical power from battery 6 and for supplying the converted electrical power across terminals 8a and 8b. As illustrated in FIG. 1A, the voltage across the DC to DC converter 8 (called voltage V in FIG. 1A) may not necessarily be the same as the battery 6 voltage $V_{bat}$.

FIG. 1B also illustrates a prior art system, illustrated generally by reference numeral 3 and comprising three batteries 6 connected in series with a single DC to DC converter $C_1$ connected across all of the batteries 6. In this way, the DC to DC converter $C_1$ can convert the power from all of the batteries B to a useful form either for a load (not shown) or for use by a further converter $C_2$. The voltage V across the output side of converter $C_1$ as well as the output side of converter $C_2$ may not be equal to the total voltage $V_a + V_b + V_c$ across all three of the batteries 6. One advantage of this system illustrated in FIG. 1B is that a single converter $C_1$ may be used regardless of the number of batteries B.

However one disadvantage of this system arises because the converters $C_1$ and $C_2$ are each connected across a whole series of three batteries 6. This type of power converter connection prevents or limits the ability to monitor and to test the individual batteries 6 connected in series. Furthermore, as is known to persons skilled in the art, if one of the batteries 6 fails, then it is not possible to transfer any current through the failed battery with the potential result that all batteries connected in series may fail if a single battery in the series fails. One manner in which to overcome this problem would be to have a bypass circuit, such as the one including resistor $R_1$ illustrated in FIG. 1B. This kind of bypass circuit allows power to be communicated from or to the three batteries in the event that the associated battery fails. However, bypass circuits can be expensive and difficult to implement and may not be tested for a number of years or until its associated battery 6 fails. This infrequent testing means that the circuit may not be operating at a time of emergency.

By way of example, U.S. Pat. No. 6,377,024 to Choy discloses a method and system to charge and discharge lithium ion batteries having a plurality of cells in series. This system utilizes a central discharge controller and a central charge controller to discharge and charge the batteries while maintaining equalized charge at each cell. However, a system such as this, which has a centralized discharger and charger, suffers from the disadvantage that it is difficult or impossible to individually control the charging or discharging of each cell.

Furthermore, having centralized control leaves the entire system open to failure should a single cell fail. In general, it is not possible to have current pass through a battery or cell which has failed. If a single battery of Choy's system fails, then the entire Choy system will fail, generally requiring replacement or other service.

U.S. Pat. No. 5,773,962 to Nor discloses a long chain battery for supplying power to a load such as an electric vehicle. The main control module and a plurality of battery modules are provided. Each battery monitoring module will monitor a number of batteries and the current carrying wire between them, so that incipient problems may be detected before failure or significant damage occurs. However, Nor also fails to disclosure monitoring each battery individually as opposed to a number of batteries collectively. Furthermore, Nor fails to disclose a suitable means to deal with a failure which may be detected because Nor's battery monitoring system treats two whole sets of batteries and it's connecting circuitry as a single unified entity.

Several publications disclose systems with multiple batteries and multiple DC to DC converters, where the load-side terminals of the DC to DC converters are connected with each other in parallel. These publications include: (1) U.S. patent application publication No. 2003/0107906 to Tokunaga et al. (uninterruptible power supply with rechargeable batteries); (2) U.S. patent application publication No. 2003/0091882 to Schmidt et al. (fuel cell batteries); and (3) U.S. patent application publication No. 2002/0070705 to Buchanan et al. (vehicle charging system). In the Buchanan et al. vehicle charging system, it is noted that the DC to DC converters can drain selected batteries to obtain power to charge other batteries, allowing for batteries to be cycled.

U.S. patent application publication No. 2001/0049038 to Dickman et al. discloses a fuel cell system with a plurality of fuel cell stacks. The Dickman et al. system is uses a hydrogen gas stream to produce electrical power for various loads, such as vehicles, boats, lights, microwave relay stations and communication equipment. The Dickman et al.

system features redundant fuel cell stacks, where a plurality of fuel cell stacks delivers the same, or greater, maximum rated power output as a comparable single-stack fuel cell system.

In some embodiments of the Dickman et al. system, each fuel stack is respectively connected to a DC to DC converter. As stated in the Dickman et al. published application, the regulated DC output from these DC to DC converters may be connected in parallel or series. For present purposes, discussion shall focus on the disclosed Dickman et al. embodiment where the output of DC to DC converters are connected in series. It is noted that Dickman et al. does not disclose the use of any sort of fuel-less battery, as the fuel stacks of Dickman et al. utilize hydrogen gas as a fuel. It is further noted that Dickman et al. does not disclose the use of any sort of rechargeable battery, as the fuel stacks of Dickman et al. utilize a continuing hydrogen stream to generate its electrical power. (See DEFINITIONS section below for definitions of "fuel-less battery" and "rechargeable battery.") Also, because the fuel cell stacks of Dickman et al. uses a continuous stream of hydrogen gas for fuel, they do not have energy capacities the way that fuel-less batteries do.

In the Dickman et al. device, each fuel stack, and associated, dedicated DC to DC converter has only two operational states, off and on. If a given fuel cell stack and associated DC to DC converter is off, then the fuel cell stack does not produce current and its DC to DC converter will not convert power from the turned-off fuel stack. If a given fuel cell stack and associated DC to DC converter is on, then the DC to DC converter is controlled so that its output voltage matches some predetermined value. This predetermined output voltage value is disclosed to depend only on whether the output voltage is being applied to a battery assembly or, alternatively, to a load of a device. The predetermined output voltage is not disclosed to depend upon the operational status of its associated fuel cell or any of the other fuel cells in the system. The predetermined output voltage is also not disclosed to vary among the DC to DC converters that happen to be on at a given time.

Description Of the Related Art Section Disclaimer: To the extent that specific publications are discussed above in this Background section, these discussions should not be taken as an admission that the discussed publications (e.g., patents) are prior art for patent law purposes. For example, some or all of the discussed publications may not be sufficiently early in time, may not reflect subject matter developed early enough in time and/or may not be sufficiently enabling so as to amount to prior art for patent law purposes.

SUMMARY OF THE INVENTION

There is still need for improved battery control and for battery-powered systems that can easily survive failure of one or more of the batteries. There is also a need for a battery controller and a method of controlling batteries which can periodically test and/or charge and discharge batteries in order to ensure that they are operating correctly, especially for backup systems which may not be used for a number of years or until an emergency arises. Furthermore, it is desirable to provide battery controllers at the lowest feasible cost.

Accordingly, it is an object of some embodiments of this invention to at least partially overcome some of the disadvantages of the prior art. Also, it is an object of some embodiments of this invention to provide a battery controller and a method for controlling batteries which can survive failure of one or more of the batteries. Furthermore, it is an object of some embodiments of the present invention to provide a battery controller and method which has increased robustness. Furthermore, it is an object of some embodiments of this invention to provide a system which can individually control and monitor each battery amongst a plurality of batteries to ensure that the batteries are operating correctly, and, to increase the longevity of each of the batteries.

One aspect of the present invention is an apparatus for providing electrical power. The apparatus includes fuel-less batteries and two battery power converters. The fuel-less batteries are structured to discharge and thereby supply electrical power. The first battery power converter includes battery-side terminals and load-side terminals. The battery-side terminals of the first battery power converter are connected across at least one fuel-less battery of the plurality of fuel-less batteries. The second battery power converter includes battery-side terminals and load-side terminals. The battery-side terminals of the second battery power converter are connected across at least one fuel-less battery of the plurality of fuel-less batteries. The load-side terminals of the first and second battery power converters are electrically connected to each other in series.

Another aspect of the present invention is apparatus for storing and discharging electrical power. The apparatus includes rechargeable batteries and two battery power converters. The rechargeable batteries are structured to store and discharge electrical power. The first battery power converter includes battery-side terminals and load-side terminals. The battery-side terminals of the first battery power converter are connected across at least one rechargeable battery of the plurality of rechargeable batteries. The second battery power converter includes battery-side terminals and load-side terminals. The battery-side terminals of the second battery power converter are connected across at least one rechargeable battery of the plurality of rechargeable batteries. The load-side terminals of the first and second battery power converters are electrically connected to each other in series.

Another aspect of the present invention is an apparatus for providing electrical power. The apparatus includes batteries two battery power converters and two battery power diagnostic devices. The batteries are structured to discharge and thereby supply electrical power. The batteries include at least a first battery subset and a second battery subset. The first battery subset and the second battery subset are not identical subsets. The first battery power converter includes battery-side terminals and load-side terminals. The battery-side terminals of the first battery power converter are connected across the first battery subset. The first battery power diagnostic device is connected across the first battery subset. The second battery power converter includes battery-side terminals and load-side terminals. The battery-side terminals of the second battery power converter are connected across the second battery subset. The second battery power diagnostic device is connected across the second battery subset.

Another aspect of the present invention is an apparatus for providing electrical power. The apparatus includes batteries, battery power converters and control circuitry. The batteries are structured to discharge and thereby supply electrical power. The battery power converters are electrically connected to the plurality of batteries so that the electrical discharge of the plurality of batteries supplies power to the battery power converters. The control circuitry is structured and located to control the battery power converters so that at least two of the plurality batteries will discharge at substantially the same rate.

Accordingly, one advantage of some embodiments of the present invention is that, because the batteries are not connected in series, but rather the converters are connected in series, failure of any one battery will not cause current flowing through any other battery to cease. Rather, because the converters are connected in series as opposed to the batteries being connected in series, failure of any one battery can easily be corrected by permitting current to flow through the converter. Converters, unlike batteries, usually permit current to flow through them even when the battery associated with the converter is not operating. Accordingly, this increases the flexibility and robustness of the overall battery controller and battery system.

A further advantage of some embodiments of the present invention is that, by having each DC to DC converter electrically connectable to a respective battery of the plurality of batteries, the converter can also monitor the voltage and/or current coming from its corresponding battery in order to better assess whether or not it has failed, will fail or is operating improperly. This increases the robustness of the system by providing information on each battery to attempt to make early predictions of battery failure.

A further advantage of some embodiments of the present invention is that, because each DC to DC converter is electrically connectable to a respective battery of the plurality of batteries, it is possible to have an individual battery charged and discharged, regardless of the status of the other batteries. This could be used, for example, to periodically discharge a battery and then recharge it to ensure that the battery is operating properly. This is potentially important because failure to periodically discharge and charge batteries of some chemistries, could adversely affect the capacity of the disused battery. For instance, and in particular, if the batteries are being used for backup, or, if the batteries are not discharged for 1, 2 or 5 years, it is possible that the total energy capacity of the batteries will decrease and degrade even if the voltage across the batteries remains the same. Therefore, by discharging and charging the batteries, not only is the true energy capacity of the battery easily determined, but the mere process of discharging and recharging the batteries could greatly increase the longevity and energy capacity of the batteries.

A further advantage of the present invention is that in some preferred embodiments, the batteries are arranged such that the maximum nominal voltage across any battery and therefore across any DC to DC converter is preferably in the range of 5 volts to 30 volts, more preferably in the range of 10 volts to 25 volts and still more preferably in the range of 15 volts to 22 volts.

Consider a battery-powered system where the total number of batteries is represented by N, and if the total expected voltage during nominal discharge for the battery system is represented by the $V_{total}$, and each battery contributes approximately an equal share of the total power. In this preferred embodiment, the voltage of any one DC to DC converter is approximately $V_{total}/N$. preferably, this $V_{total}/N$ value is less than 30 volts so that low-voltage, low-cost DC to DC converters can be used. In this way, while a larger number of converters may be required in order to implement the battery controller, the converters can be used in the lower voltage range, which tends to be more economical and often more energy efficient. Therefore, even though a larger number of DC to DC converters may be required, the total cost may not be significantly greater than a single converter. This cost benefit is especially likely if the rated voltage of the DC to DC converters is in the preferred ranges set forth above.

Further aspects of the invention will become apparent upon reading the following detailed description and drawings, which illustrate preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1A:
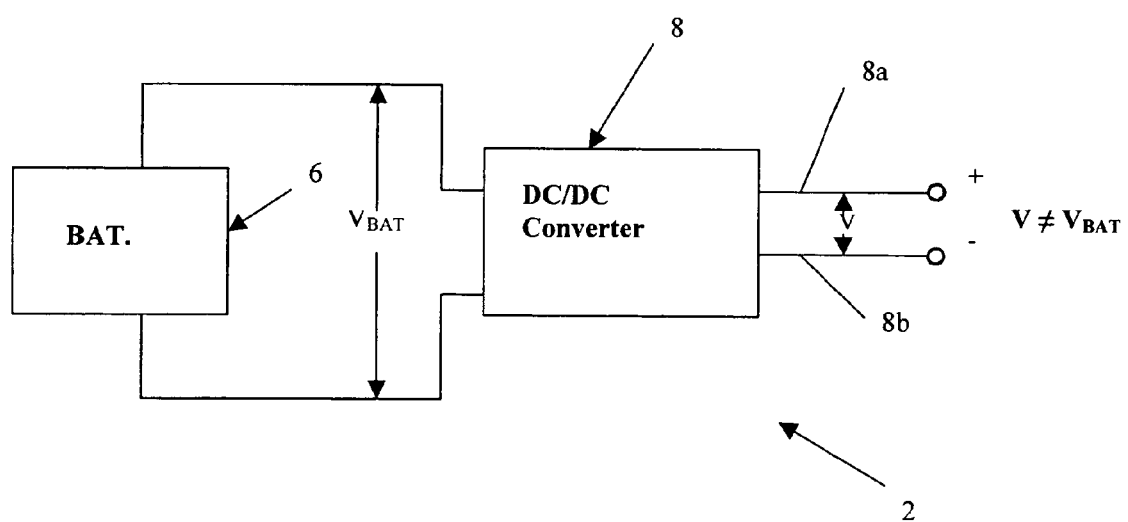
FIG. 1A illustrates a conventional battery controller having a single battery.
Figure 1B:
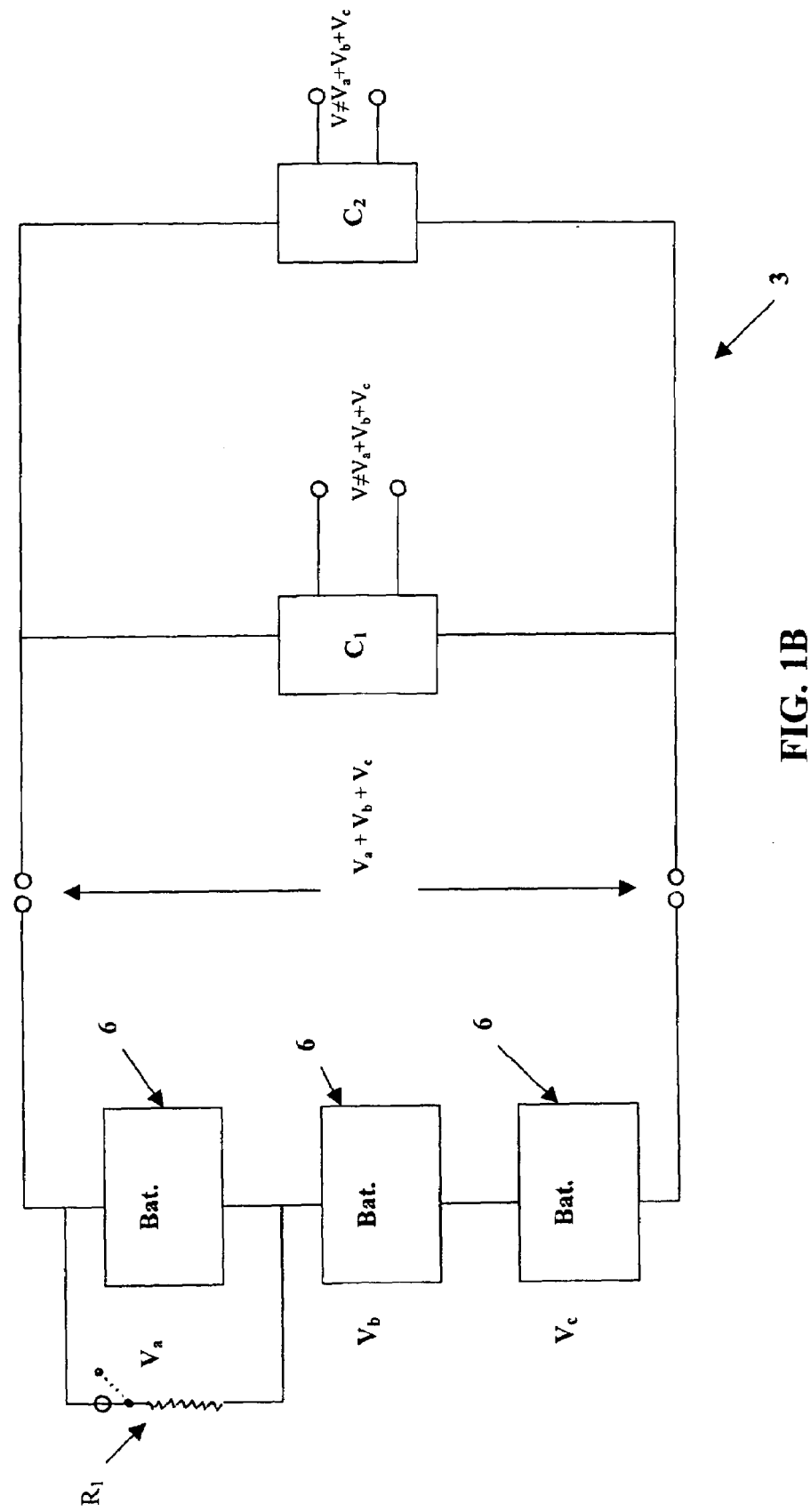
FIG. 1B illustrates a conventional battery controller for controlling more than one battery.
Figure 2:
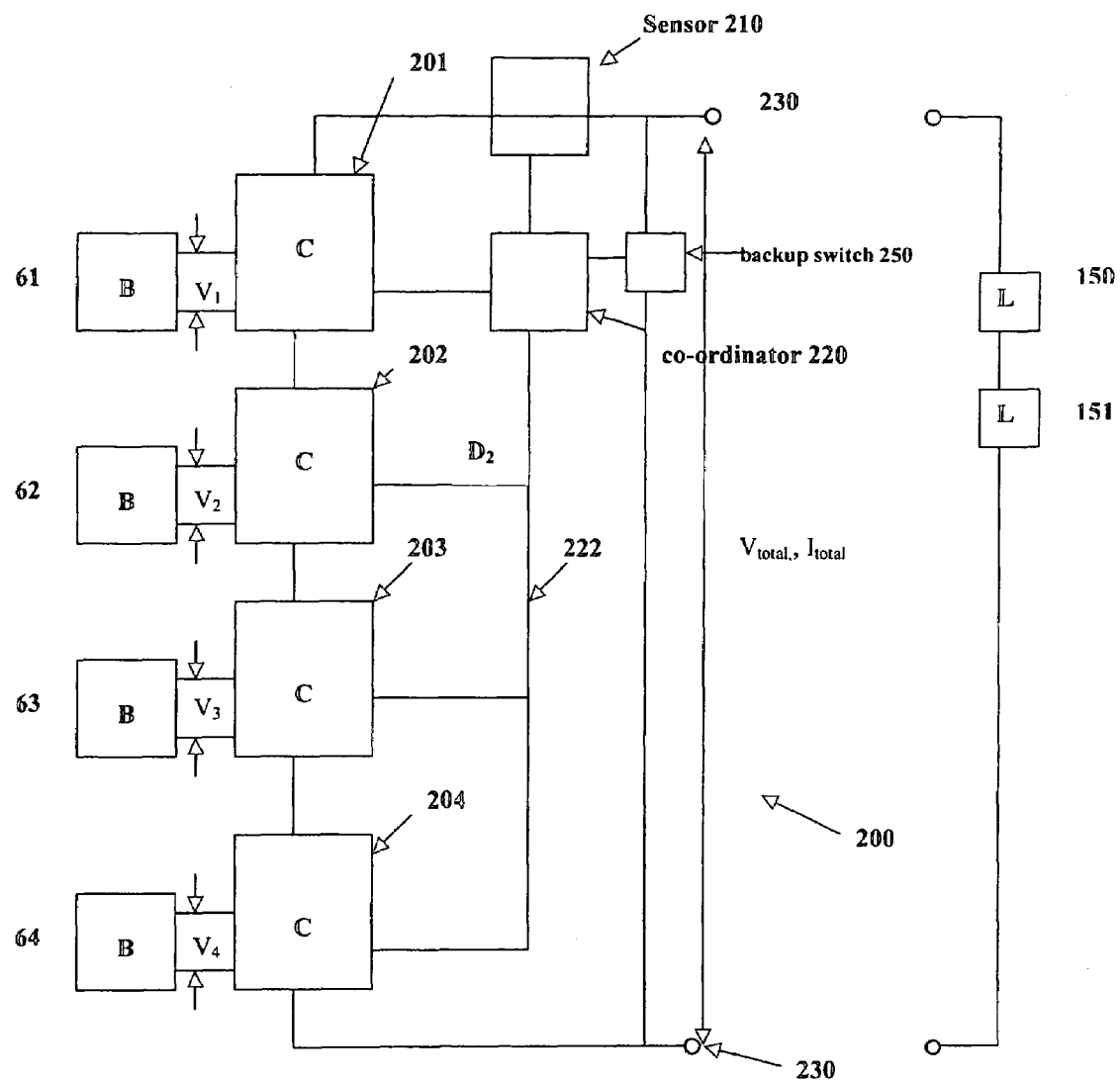
FIG. 2 is a schematic diagram according to a first embodiment of the present invention.

Battery controller apparatus 200, an embodiment of the present invention, is shown in FIG. 2 and will now be discussed. Apparatus 200 is designed to charge, recharge and discharge several batteries B (individually identified by reference numerals 61 to 64). Apparatus 200 further includes several DC to DC converters, shown generally by the letter C (identified individually by reference numerals 201, 202, 203 and 204). As illustrated in FIG. 2, the DC to DC converters are connected to each other in series. Each DC to DC converter C is also respectively electrically connected to a battery B selected from the set of batteries. In preferred embodiment 200, the batteries B are not electrically connected (or necessarily connectable) to each other. In alternative embodiments, there may be various series and/or parallel connections among some or all of the batteries. A potential drawback of these alternative embodiments is that failure of one or more of the connected batteries will tend to have a greater adverse effect on the system (e.g., on other batteries) than failure of a relatively isolated battery as in preferred embodiment 200. Nevertheless, there may be applications where it is acceptable, or even preferable, to have various electrical connections among some or all of the batteries, depending primarily upon the power, cost and/or reliability requirements of the system. Even though FIG. 2 illustrates four batteries 61 to 64 and four respective converters 201 to 204, it is understood that the invention is not limited to this number, but rather could be applied to any system including two or more batteries.

As also illustrated in FIG. 2, a co-ordinator 220 is connected to each of the plurality of DC to DC converters C. The co-ordinator 220 sends control signals to the DC to DC converters C for controlling the charging and discharging of the respective battery 61, 62, 63, 64. Preferably, the control signals are sent through the electrical connection 222, which may be structured as a computer bus. However, the control signals could also be sent by any other manner, including wirelessly or at different frequencies together with the DC current $I_{total}$ across terminals 230.

In this way, the power from each of the batteries B will pass to its respective converter C and the converted power will then pass to the terminals 230. Terminals 230 can be connected to power one or more loads so that electrical power can be transferred from the batteries B to one or more loads L. Furthermore, the terminals 230 could be connected to a power source (not shown) to assist in recharging the batteries B, assuming the batteries are rechargeable.

In operation, a single DC to DC converter would be electrically connectable to a respective battery of the plurality of batteries. If, for whatever reason, one DC to DC converter C does not have a respective battery to be connected to, the DC to DC converter C would operate simply as a short circuit to allow power and current from the other DC to DC converters C to flow through it without interruption. Although DC to DC and other power converters are usually able to operate as a bypass in this way, it is to be understood that bypass functionality is not a requirement of all power converters or all embodiments of the present invention.

Likewise, if a battery connected to an associated DC to DC converter C malfunctions, current could still flow through the associated DC to DC converter C without interruption, even though the respective battery B has malfunctioned. This avoids failure of the battery controller should a single battery malfunction.

Co-ordinator 220 co-ordinates the operation of the converter C in order to control the charging and discharging of each battery by controlling each respective converter. Co-ordinator 220 thereby selectively controls the discharging and charging of each battery in order to transfer electrical power from the plurality of batteries to one or more loads L. Similarly, co-ordinator 220 can selectively control the respective DC to DC converters C to co-ordinate charging of the batteries B.

In order to more efficiently control the batteries B through their respective DC to DC converters C, the co-ordinator may receive information regarding the total voltage $V_{total}$ and total current $I_{total}$ passing through the DC to DC converters C. Accordingly, the controller embodiment 200 comprises a sensor 210. Sensor 210 may sense total current $I_{total}$, voltage $V_{total}$ and/or other characteristics of the electrical power being output. In a preferred embodiment, each of the DC to DC converters C sense the voltage passing across the respective batteries B and send this information to co-ordinator 220 through electrical connection 222. It is also understood that $V_{total}$ represents the sum of the voltage across all of the converters C and this may not necessarily be the same at the sum of the voltages $(V_1+V_2+V_3+V_4)$ across the batteries B because the converters C will likely have converted the voltage of their respective batteries.

In addition to co-ordinator 220 controlling the discharging and charging of a plurality of batteries to transfer electrical power from the plurality of batteries to one or more loads, co-ordinator 220 can also control the DC to DC converter C in order to affect a particular one battery of the plurality of batteries. For instance, the co-ordinator 220 can send a signal $D_2$ to one of the plurality of DC to DC converters C, such as converter 202. The signal $D_2$ can instruct converter 202 to commence discharging battery 62, which is electrically connected to the converter 202. In this way, co-ordinator 220 can monitor the discharge of battery 62 to ensure that battery 62 is discharging or otherwise operating correctly in order to ensure that battery 62 is available for use in the future.

This can be particularly useful, as indicated above, in backup battery systems which may not be used for extended periods of time. Testing capacity of each battery is important because a battery may not have the electrical capacity that is expected and/or needed. Furthermore, many batteries require periodic discharging and charging in order to improve their longevity and electrical capacity. Therefore, co-ordinator 220, in addition to periodically discharging a specific battery for testing, can also periodically discharge and then recharge one or more of the batteries to improve their longevity and better maintain energy capacity.

It is noted that co-ordinator 220 could discharge a particular battery whenever the need arises to service an external load. However, in the case of a backup system, co-ordinator 220 may simply transfer electrical energy from one battery, such as battery 61 to a subsequent battery, such as battery 62, in order to discharge and charge the batteries in a periodic fashion. This could be performed, for example, through a closed loop of all of the converters C by co-ordinator 220 closing a switch, such as backup switch 250. If no backup switch 250 is present, then it may be possible to perform the foregoing kind of energy transfer between batteries only when running current through terminals 230 and loads 150, 151.

The deliberate transfer of electrical energy between batteries can help provide diagnostic information about how much capacity each battery has. If a battery is intentionally discharged completely, and its energy output is measured over the interval of the discharge, then the capacity of the battery will be known. Of course, this can help provide information about how quickly a given battery is losing capacity and how soon it may need to be serviced or replaced. In this way, some embodiments of the present invention may perform the function of a conventional battery cycling machine, wherein a battery's storage capability is tested using these other batteries in the apparatus to provide temporary energy storage.

It is understood that the DC to DC converters C can be any type of DC to DC converter which can be operated by co-ordinator 220 and used to charge and discharge the batteries electrically connected to them. However, FIGS. 3A, 3B, 3C and 3D illustrate preferred embodiments of the DC to DC converters in buck boost and a buck/boost four quadrant operation. It is understood that these are given merely by way of example and the present invention is not limited to the specific circuits illustrated in FIGS. 3A to 3D.

Furthermore, it is understood that the circuits 3A to 3D contain a number of switches S which operate in combination with the capacitors and inductors shown therein to selectively charge and discharge the corresponding battery. The signals used to operate the switches may come from a variety of sources. For example, the switches S can be operated either by co-ordinator 220 in response to signals along connection 222, or, in more sophisticated systems, by software present on each of the respective DC to DC converters C in response to signals received from coordinator 220. Furthermore, in a preferred embodiment, the DC to DC converters C may be used in reverse, namely to provide electrical power to batteries B such as for recharging.

It is also noted that the present invention, as illustrated in the FIG. 2, may include other devices and components including filters, capacitors, inductors and sensors, as is known in the art to operate battery controller apparatus 200. These other devices and components have been omitted from the drawings for the sake of clarity of illustration.

One important advantage of some embodiments of the present invention is the ability to discharge a set of batteries at controlled rates. For example, it is often desirable to discharge batteries at the same rate with respect to their remaining capacities, so that if the batteries are not recharged, they will run down at approximately the same time.

Figure 3A:
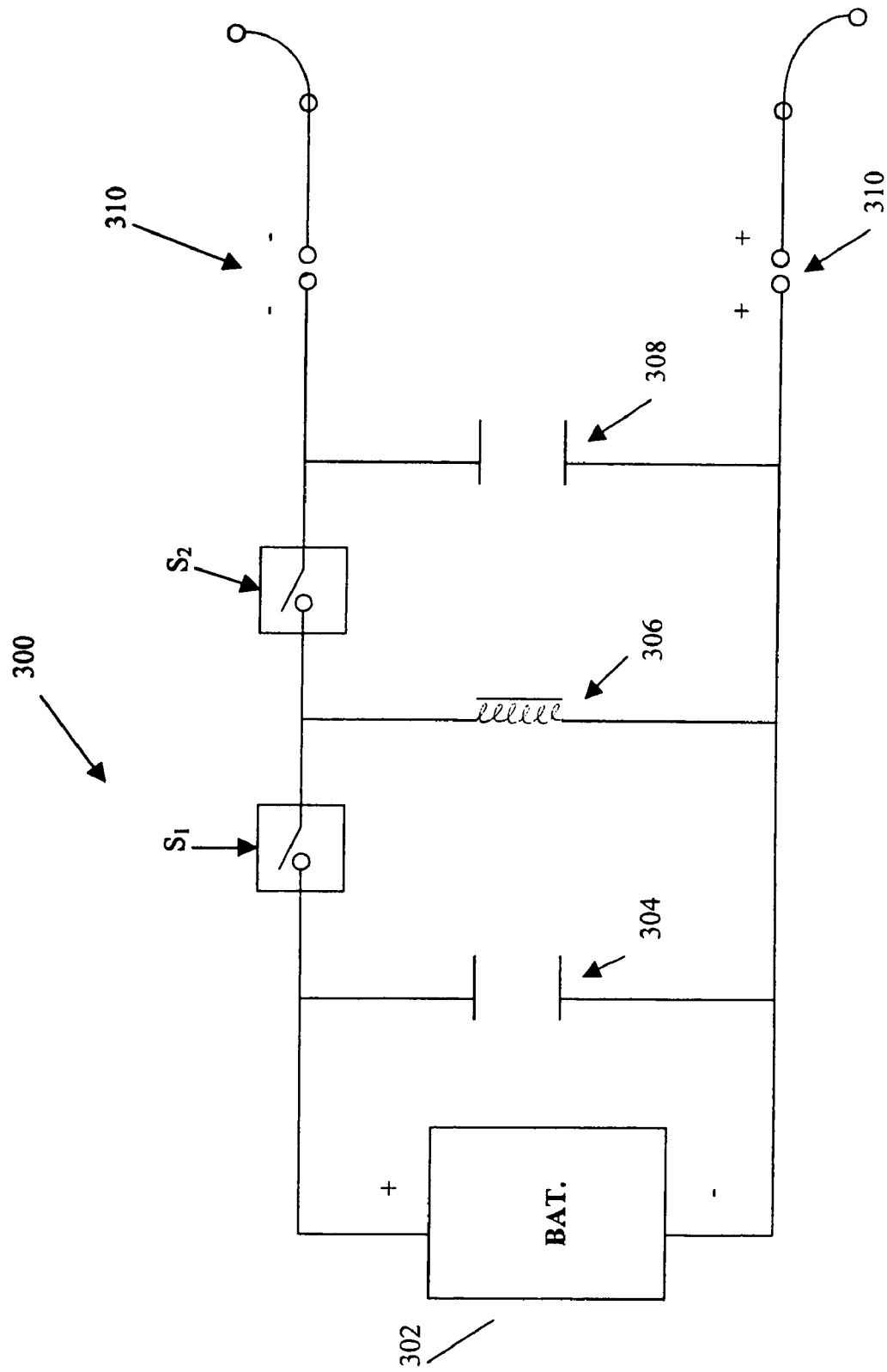
FIG. 3A illustrates a DC to DC converter which can be used in a system illustrated in FIG. 2 having a buck/boost operation according to one embodiment of the present invention.
Figure 3B:
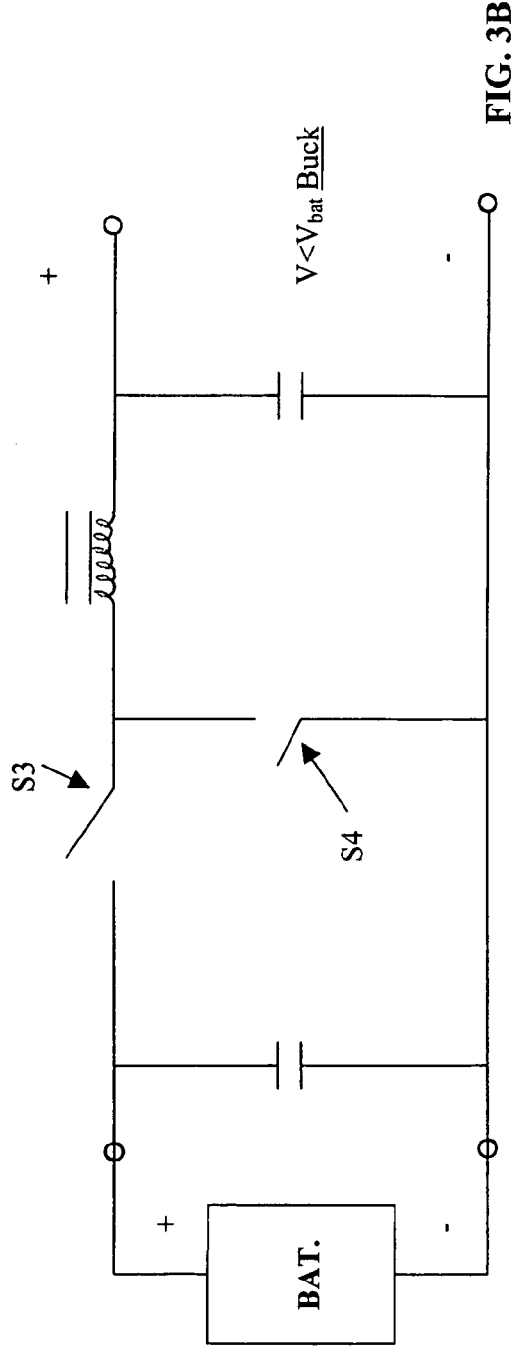
FIG. 3B illustrates a DC to DC converter which can be used in a system illustrated in FIG. 2 having a buck operation according to one embodiment of the present invention.
Figure 3C:
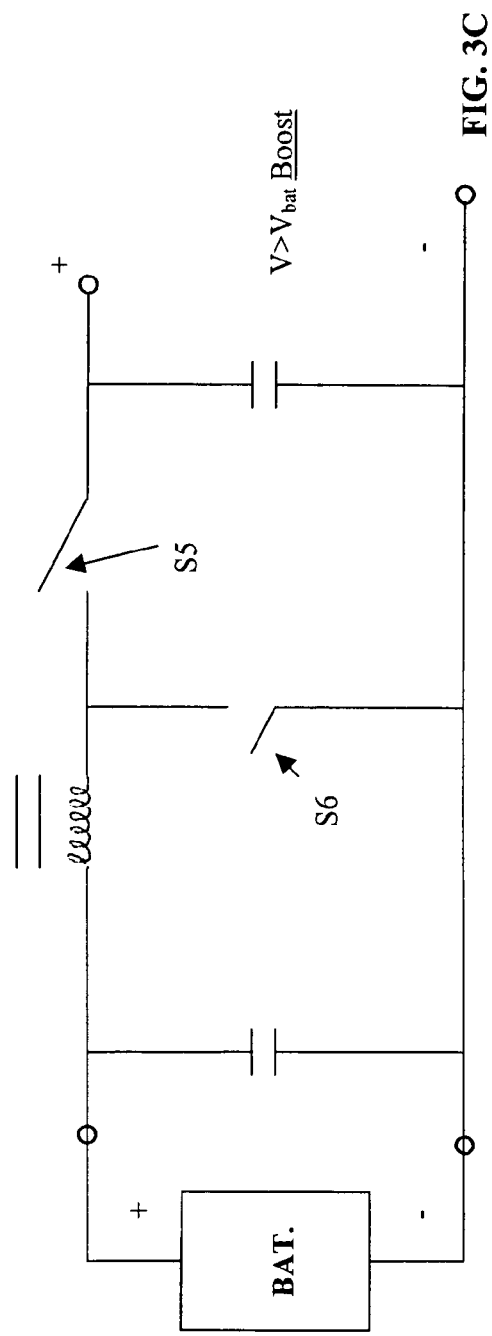
FIG. 3C illustrates a DC to DC converter which can be used in a system illustrated in FIG. 2 having a boost operation according to one embodiment of the present invention.
Figure 3D:
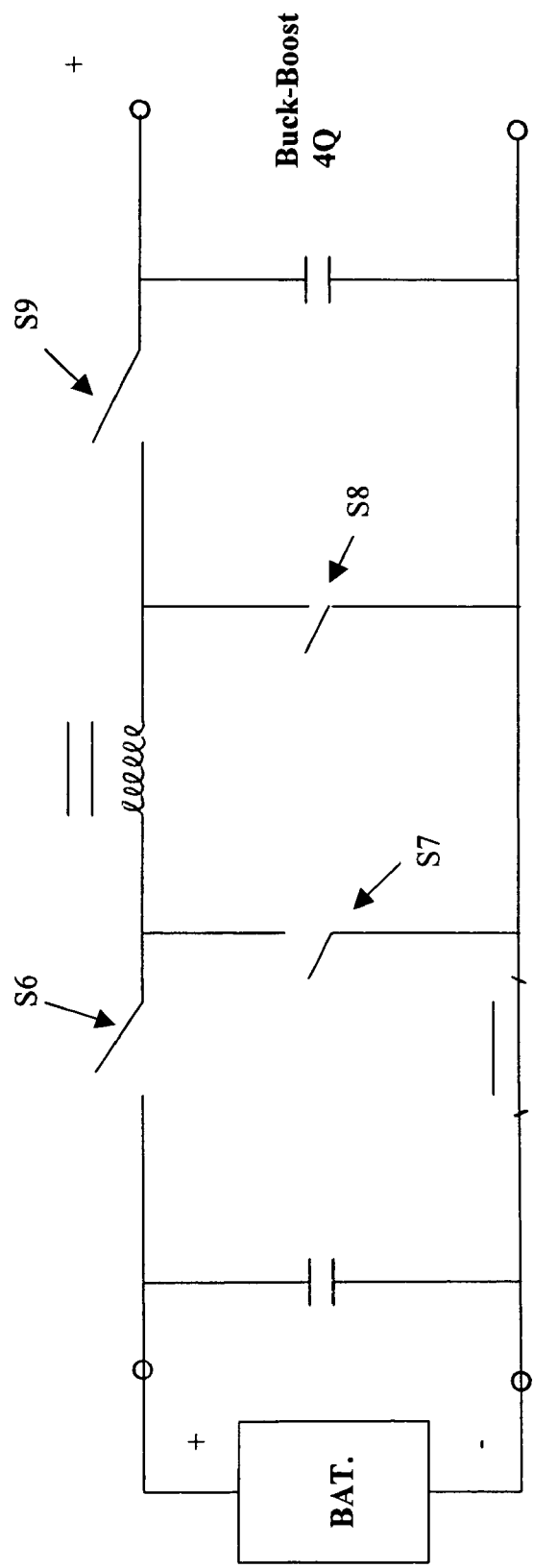
FIG. 3D illustrates a DC to DC converter which can be used in a system illustrated in FIG. 2 having a buck/boost four quadrant operation according to one embodiment of the present invention.

These advantages of controlled rate of discharge and similar discharge rate will now be discussed with reference to the DC to DC converter 300 of FIG. 3A. Consider an initial state for converter 300 where: (1) the battery is fully charged; (2) switch $S_1$ is closed; and (3) switch $S_2$ is open. Current will flow from the battery to charge capacitor 304. Current will also start to flow from the battery through inductor 306.

Now consider a first subsequent state for converter 300 where: (1) switch $S_1$ is opened; (2) switch $S_2$ is closed; and (3) terminals 310 are connected to an electrical load. When the switches are switched to this first subsequent state, current will continue to flow through the inductor, even though it has been electrically disconnected from battery 302 and capacitor 304. This continuing flow of current through inductor 306 will charge capacitor 308, with a polarity as indicated by the plus and minus signs shown at terminals 310. In addition to charging up capacitor 308, some current will also flow through terminals 310 to provide electrical power to the load. Again, the polarity of this current is shown by the plus and minus signs at load-side terminals 310.

If converter 300 remained in this first subsequent state then inductor 306 would gradually stop supplying current, capacitor 308 would discharge and at some point converter 300 would stop supplying electrical power to the circuit. However, consider that the switches are switched relatively quickly from this first subsequent state to a second subsequent state. In the second subsequent state: (1) switch $S_1$ is again closed; (2) switch $S_2$ is open; capacitor 304 is charged; and (4) capacitor 308 is charged. In this second subsequent state, capacitor 304 and the battery will tend to cause current to increase through inductor 306 due to the closure of switch $S_1$. At this point, inductor 306 will be electrically disconnected from the load due to the open state of switch $S_2$. Capacitor 308 will discharge to supply power to the load.

Now consider that converter is now alternated between the first subsequent state and the second subsequent state in a controlled manner. Inductor 306 will tend to have somewhat continuous current flow, alternately receiving current from capacitor 304 and the battery and supplying current to capacitor 308 and the load. Significantly, the battery will be discharged at a rate determined largely by the proportion of the time switch S1 is closed. If several DC to DC converters are connected in series, then these converters can be controlled in a co-ordinated manner so that the batteries discharge at proportionate rates. For example a first battery could be controlled through the apparatus of converter 300 to discharge its remaining capacity twice as fast as another battery in the system (controlled through the apparatus of another DC to DC converter). This kind of controlled discharge rates are preferably accomplished by connecting the load-sides of DC to DC converters (e.g., like converter 300) in series with each other.

Preferably, the batteries are controlled so that they will discharge their respective capacities in a roughly synchronous manner so that some or all of the batteries in the system will be discharged at roughly the same time. This can be advantageous for both rechargeable and non-rechargeable battery systems because it helps ensure that the controlled batteries will all discharge most or all of their electricity by the time battery recharge or replacement is required. This can be advantageous for rechargeable battery systems because: (1) it helps ensure that no battery will run down completely in the interval between battery recharges; and (2) it helps ensure that all of the batteries are undergoing charge/discharge cycles at roughly the same frequency so that the rechargeable batteries will all remain effective as long as possible. Similarly, the recharge of rechargeable batteries can be controlled so that charging occurs in a roughly synchronous manner and multiple batteries finish recharging at approximately the same time.

There are potential advantages to discharging batteries in a roughly synchronous manner. Roughly synchronous discharge means that the operating time is maximized. Furthermore, for most batteries, faster the discharge of the battery means that less energy can be discharged from the battery due to known transient phenomena inherent in battery chemistry and physics. When each battery is discharged at the same rate, relative to its capacity, then each battery will be discharging as slowly as possible consistent with providing the required power to the loads. Through this relatively slow battery discharge, the total energy that will be output will increase.

When multiple batteries are controlled to discharge at proportionate rates, the power output at the load-side terminals of the DC to DC converters is effectively controlled to be proportionate. Because the DC to DC converters are connected in series, current control cannot generally be used to effect this proportionate discharge. Rather, the proportionate discharge (or recharge) is preferably effected by controlling the voltage drop across the load-side terminals of each converter. However, in many applications, the voltage drop across the series-connected set of Dc to DC converters must be regulated to have some constant, predetermined value. This means that the co-ordinator will preferably control the voltage drop across each converter to simultaneously: (1) achieve any desired proportionate battery discharge; and (2) maintain a constant, predetermined voltage drop across the series-connected set of converters.

Figure 4:
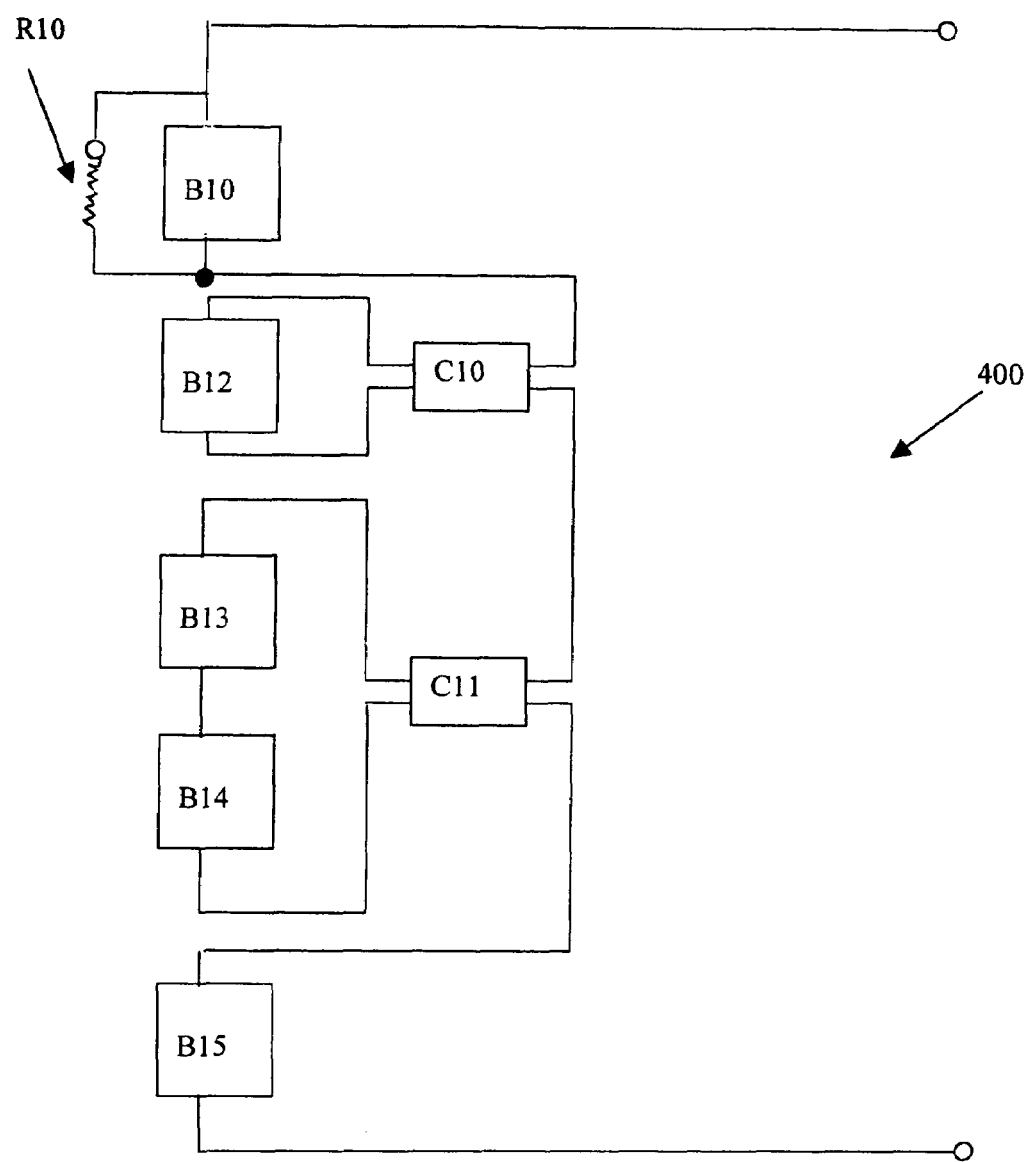
FIG. 4 is a schematic diagram of a second embodiment of the present invention.

FIG. 4 illustrates an apparatus 400 for charging and/or discharging batteries. Apparatus 400 includes: (1) fuel-less, rechargeable batteries B10, B12, B13, B14, B15; (2) converters C10, C11; (3) bypass circuitry R10; and (4) various electrical connections between the above-mentioned components (as shown in FIG. 4). Apparatus 400 is not necessarily a preferred embodiment, but is provided to help give some idea of the potential scope of the present invention.

As shown in FIG. 4, not all batteries apparatus 400 are subject to the power conversion of a power converter. For example, battery B10 is connected in series with the load-side terminals of converters C10 and C11. Battery B10 is associated with bypass circuitry R10, which bypass circuitry helps protect the system in the case of failure of battery B10. Battery B15 is also not subjected to power conversion as shown in FIG. 4. Of course, there may be severe problems with the apparatus if battery B15 fails because it is subject to neither power conversion nor any other type of bypass circuitry.

As shown in FIG. 4, batteries B13 and B14 are connected in series. This series-connected subset of batteries B13 and B14 is connected across the battery-side of power converter C11. If either battery B13 or battery B14 fails, then this subset will not be able to supply or receive electrical power. However, there is still some advantage here in that batteries B13 and B14 are somewhat isolated from the rest of apparatus 400 from a power transfer and monitoring perspective.

Figure 5:
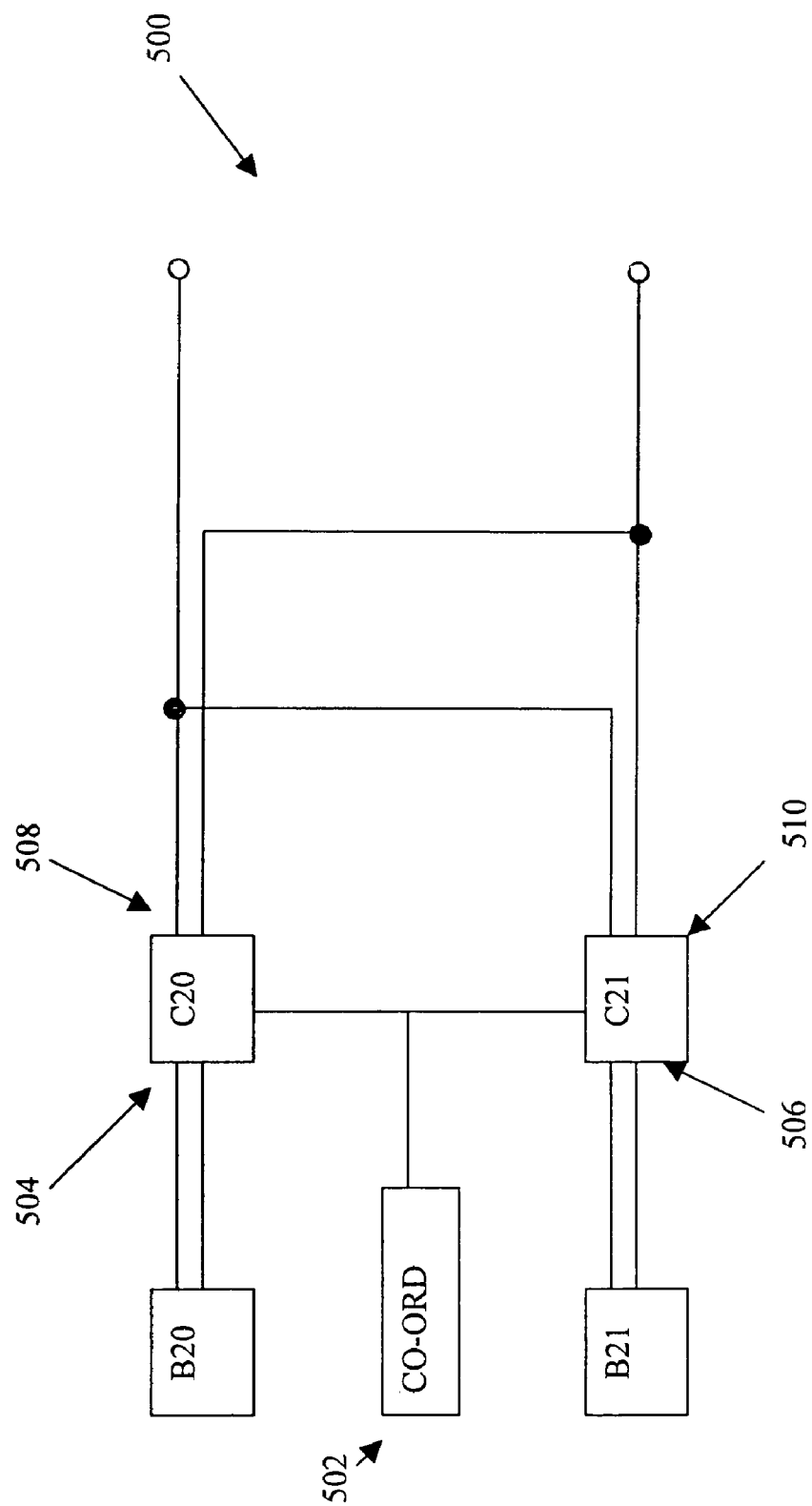
FIG. 5 is a schematic diagram of a device where two DC to DC converters are connected in parallel.

FIG. 5 shows apparatus 500. Apparatus 500 includes coordinator component 502, rechargeable battery B20, rechargeable battery B21, battery power converter C20 and battery power converter C21. Converter C20 includes battery-side terminals 504 and load-side terminals 508. Converter C21 includes battery-side terminals 506 and load-side terminals 510. As shown in FIG. 5, battery B20 is connected to converter C20 through battery-side terminals 504. Battery B21 is connected to converter C21 through battery-side terminals 506. Coordinator component 502 controls the operation of converter C20 and C21. Thereby, coordinator component 502 indirectly controls the discharging and charging of the batteries B20, B21.

In apparatus 500, the load side terminals 508, 510 are connected to each other in parallel. By virtue of this parallel connection, coordinator 502 can control the operation of converters C20 and C21 so that charge can be moved in an arbitrary fashion between batteries B20 and B21. This allows the batteries to charge each other. This feature can be highly advantageous from a power management perspective because it can help ensure that neither battery B20 or B21 completely loses all charge. Because these batteries are connected in parallel, there is no need for additional hardware similar to backup switch 250 (discussed above in connection with FIG. 2).

Figure 6:
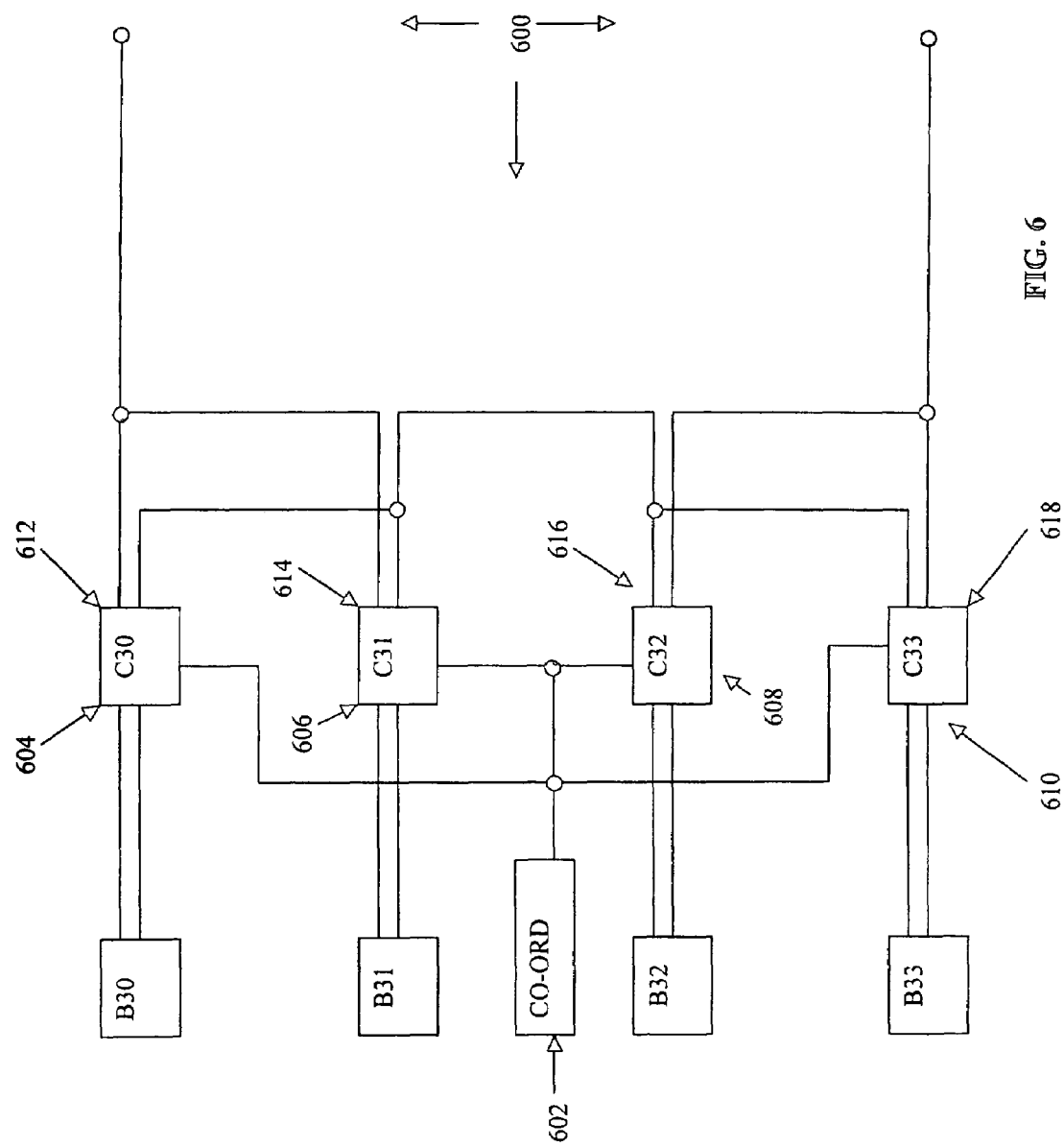
FIG. 6 is a schematic diagram of a third embodiment of the present invention.

FIG. 6 shows apparatus 600, which is a combination of two of apparatus 500 connected in series with each other. Apparatus 600 includes coordinator component 602, rechargeable batteries B30, B31, B32, B33 and battery power converters C30, C31, C32, C33. Converter C30 includes battery-side terminals 604 and load-side terminals 612. Converter C31 includes battery-side terminals 606 and load-side terminals 614. Converter C32 includes battery-side terminals 608 and load-side terminals 616. Converter C33 includes battery-side terminals 610 and load-side terminals 618. As shown in FIG. 6, each battery B30, B31, B32, B33 is respectively connected to a dedicated battery power converter C30, C31, C32, C33 through battery-side terminals 604, 606, 608, 610. Coordinator component 602 controls the operation of converters C30, C31, C32, C33. Thereby, coordinator component 602 indirectly controls the discharging and charging of the batteries B30, B31, B32, B33.

In apparatus 600, the load-side terminals of converters C30 and C31 are connected in parallel with each other. Likewise, the load-side terminals of converters C32 and C33 are connected in parallel with each other. These two parallel subsets of converters are electrically connected to each other in series. The parallel connections may help facilitate the shifting of charge between batteries in the same parallel-connected subset. The series converter connection between the subsets can help aggregate voltage from parallel-connected subsets of the batteries. Because the series connection is made between load-side terminals of converters, rather than between the batteries themselves, there are advantages from the repair, replacement and monitoring perspectives as discussed in detail above. Other embodiments of the present invention may include varying numbers of batteries, varying numbers of battery power converters and varying schemes of parallel and serial connections between the load-side terminals of the battery power converters.

Now that the embodiments of the Figures have been discussed, some possible, exemplary applications for the power supplies of the present invention will now be discussed. In general, the present invention may be advantageous in systems that require high voltage, adjustable voltage and rechargeable systems. Exemplary applications include electric vehicles, telephone transmission devices backup power supplies and uninterruptible power supplies.

It is noted that even though various features of the invention have been described with respect to one or another of the embodiments of the invention, the various features and embodiments of the invention may be combined or used in conjunction with other features and embodiments of the invention as described and illustrated herein. Also, although this disclosure has described and illustrated certain preferred embodiments of the invention, it is to be understood that the invention is not restricted to these particular embodiments. Rather, the invention includes all embodiments which are covered literally and/or by other patent law principles (e.g., the Doctrine of Equivalents) which may be applicable in a given jurisdiction.

DEFINITIONS

The following definitions are to be used when construing an/or interpreting the claims to the extent permitted by applicable law:

Battery: Any device which can chemically store and/or discharge electrical energy; batteries are not limited to any particular number of cells (including a single cell), particular materials or material states (e.g., dry, wet, gel); batteries are not limited to devices which store or output direct current (although most batteries currently operate only with direct current); examples of batteries include lithium ion batteries fuel cells and lead acid batteries.

Fuel-less Battery: Any battery (see definition above), whether rechargeable or not, that does not consume fuel. For example, a hydrogen fuel cell is not a fuel-less battery because hydrogen is the fuel and a continuous stream of hydrogen is necessary for the fuel cell to operate. As further example, convention lead acid batteries, alkaline batteries and lithium ion batteries are all fuel-less batteries. A fuel-less battery generally has a total energy capacity, representing the total amount of energy it can store. A fuel-less battery generally also has a remaining energy capacity, representing the total amount of energy it has left at a given time.

Rechargeable Battery: Any battery (see above definition) that can be recharged.

Inductor: Any electrical device put into a circuit for the purpose of adding inductance into the circuit.

Capacitor: Any electrical device put into a circuit for the purpose of adding capacitance into the circuit.

Battery power converter: any device structured to convert, in some way the power input to or output from a battery or set of batteries; this conversion is not limited to conversion of or to direct current electrical power; battery power converters may or may not include bypass circuitry; battery power converters may or may not include coordinator components for selectively controlling battery charging and discharging; battery power converters may or may not include diagnostic devices for monitoring battery performance; examples of power conversion include voltage conversion and current conversion.

Battery power diagnostic device: any device structured to monitor the performance of a battery; battery power diagnostic devices may or may not be coupled with battery power converters.

Connected Across: means electrically connected across; "connected across" covers both: (1) circuitry where the specified component(s) are the exclusive component(s) connected across; and (2) circuitry where the specified components are connected across along with other component(s) not specified in the patent claim.

The invention claimed is:

1. An apparatus for charging and discharging a plurality of batteries, said apparatus comprising:
   a plurality of batteries;
   a plurality of direct current to direct current (DC to DC) converters, each DC to DC converter comprising load-side terminals and battery-side terminals, with the load-side terminals of the DC to DC converters being connected to each other in series, and, each battery of the plurality of batteries is electrically connected to the battery-side terminals of a respective DC to DC converter; and
   a co-ordinator connected to each of the plurality of DC to DC converters for controlling charging and discharging of the battery electrically connected to the respective converter;
   wherein the series connected load-side terminals of the plurality of DC to DC converters are electrically connected to at least one load and the co-ordinator co-ordinates the transfer of electrical power from the plurality of batteries to the one or more loads;
   wherein the co-ordinator sends a first control signal to a first converter of the plurality of DC to DC converters to cause the first converter to discharge a first battery of the plurality of batteries, the first battery electrically connected to the battery-side terminals of the first converter; and
   wherein the co-ordinator monitors the discharging of the first battery to determine characteristics of the first battery including its electrical capacity.

2. The apparatus for charging and discharging a plurality of batteries as defined in claim 1 wherein each of the plurality of DC to DC converters operate in the range of 5 volts to 30 volts.

3. The apparatus for charging and discharging a plurality of batteries as defined in claim 2 wherein each of the plurality of DC to DC converters operate in the range of 10 volts to 25 volts.

4. The apparatus for charging and discharging a plurality of batteries as defined in claim 3 wherein each of the plurality of DC to DC converters operate in the range of 15 volts to 22 volts.

5. The apparatus for charging and discharging a plurality of batteries as defined in claim 2 wherein:
   N represents the total number of DC to DC converters in the plurality of DC to DC converters;
   $V_{total}$ represents the expected total voltage of the nominal discharge of the apparatus;
   the voltage of any one DC to DC converter is approximately $V_{total}/N$; and
   $V_{total}/N$ is less than or approximately equal to 30 volts.

6. The apparatus for charging and discharging a plurality of batteries as defined in claim 1 further comprising a current monitor for monitoring the current passing through the plurality of DC to DC converters connected in series.

7. The apparatus for charging and discharging a plurality of batteries as defined in claim 1 further comprising a voltage monitor for detecting the total voltage across the series connected load-side terminals of the plurality of DC to DC converters.

8. The apparatus for charging and discharging a plurality of batteries as defined in claim 1 wherein the co-ordinator sends a second control signal to a second converter of the plurality of converters to cause a second battery of the plurality of batteries, said second battery being electrically connected to the battery-side terminals of the second converter, to be charged with electrical energy being discharged from the first battery.

* * * * *